United States Patent [19]

Chien

[11] Patent Number: 5,838,862
[45] Date of Patent: Nov. 17, 1998

[54] STRIPPABLE TIGHT BUFFERED OPTICAL WAVEGUIDE FIBER

[75] Inventor: Ching-Kee Chien, Horseheads, N.Y.

[73] Assignee: Corning Incorporated, Corning, N.Y.

[21] Appl. No.: 887,595

[22] Filed: Jul. 3, 1997

Related U.S. Application Data

[60] Provisional application No. 60/029,156 Oct. 24, 1996.

[51] Int. Cl.$^6$ ................................................. G02B 6/44
[52] U.S. Cl. ................................................. 385/102; 385/104
[58] Field of Search ................................ 385/100–114

[56] References Cited

U.S. PATENT DOCUMENTS

| | | |
|---|---|---|
| 3,980,390 | 9/1976 | Yamamoto et al. . |
| 4,365,865 | 12/1982 | Stiles . |
| 4,629,286 | 12/1986 | Fuse et al. . |
| 4,748,871 | 6/1988 | Zdzislaw . |
| 4,852,244 | 8/1989 | Lukas . |
| 5,155,788 | 10/1992 | Chapin et al. ................. 385/102 |
| 5,181,268 | 1/1993 | Chien . |

*Primary Examiner*—Phan T. H. Palmer
*Attorney, Agent, or Firm*—Edward V. Charbonneau

[57] ABSTRACT

The present invention relates to a tight buffered optical waveguide fiber which includes an optical waveguide fiber, a first protective coating which surrounds and is in contact with an external surface of the optical waveguide fiber and an interfacial layer which surrounds and is in contact with an external surface of the first protective coating. The interfacial layer includes a surfactant and an antifoaming agent. The tight buffered optical waveguide fiber further includes a second protective coating which surrounds and is in contact with an external surface of the interfacial layer. The present invention further relates to a method of producing the tight buffered optical waveguide fiber.

20 Claims, 2 Drawing Sheets

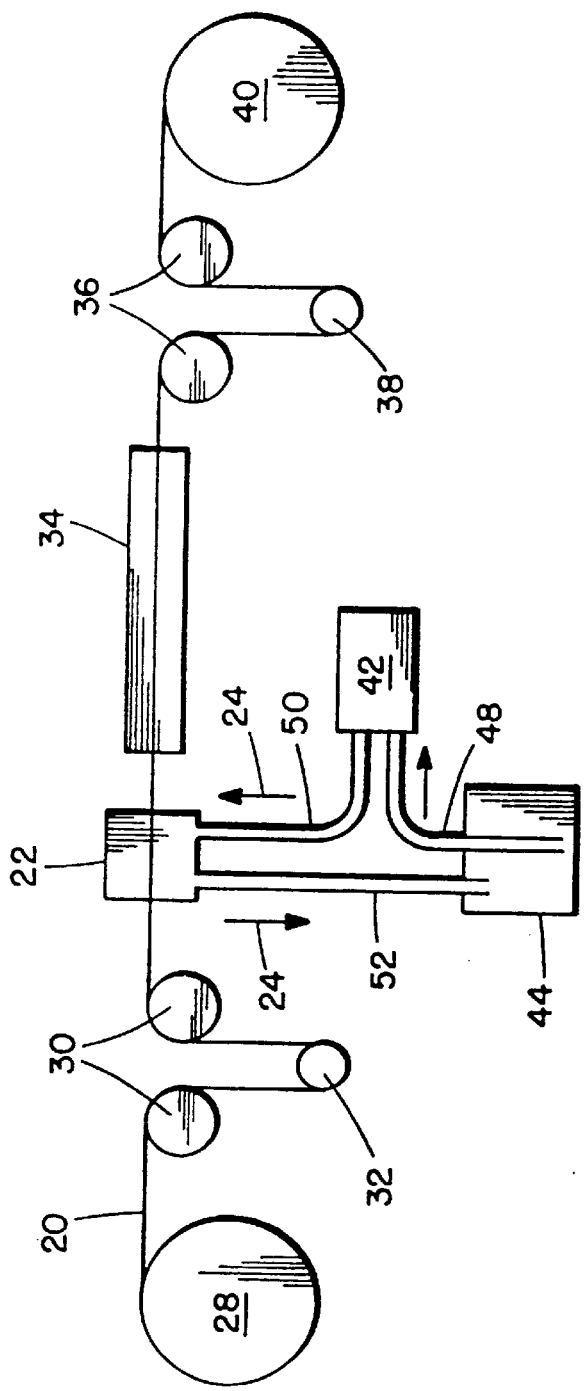
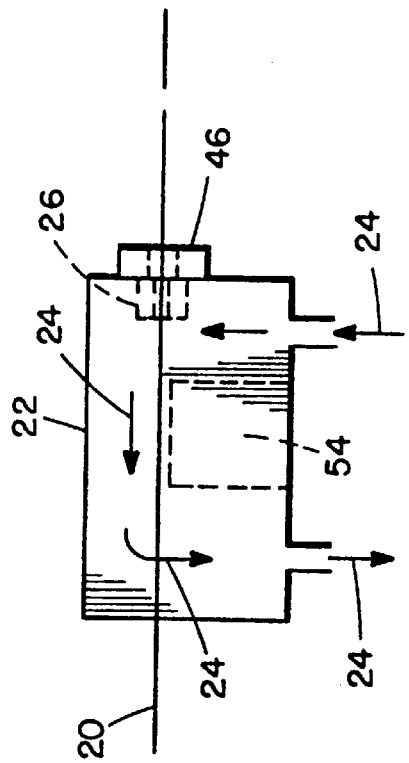

STRIPPABLE TIGHT BUFFERED OPTICAL WAVEGUIDE FIBER

This a regular application based on provisional application Ser. No. 60/029,156 filed Oct. 24, 1996.

FIELD OF THE INVENTION

This invention relates to optical waveguide fibers and, in particular, to tight buffered optical waveguide fibers having improved strippability and to a method of making the tight buffered optical waveguide fibers.

BACKGROUND OF THE INVENTION

Optical waveguide fibers generally comprise a core and a cladding, where the core has an index of refraction which is greater than that of the cladding. At the time of manufacture, the cladding is normally coated with one or more layers of a thin plastic material such as a UV-curable acrylate polymer. As used herein, this initial protective layer or layers will be referred to collectively as the fiber's "first protective coating". Typically, the outside diameter ("OD") for these components is approximately 10 microns for a single mode core (or 50–62.5 microns for a multimode core), 125 microns for the cladding, and 250 microns for the first protective coating.

Because of their relatively fragile nature and because they suffer high increases in attenuation when subjected to tensile, bending, or torsion strains, optical waveguide fibers are normally surrounded with at least one relatively thick protective layer which serves to "buffer" the fiber from its surroundings. This protective layer can be spaced from the fiber to form a "loose tube" construction, or can be in direct contact with the fiber to form a "tight buffered" construction. The present invention is concerned with tight buffered fibers.

Numerous tight buffered fibers have been disclosed in the art. See, for example, U.S. Pat. No. 3,980,390 to Yamamoto et al., U.S. Pat. No. 4,629,286 to Fuse et al., and U.S. Pat. No. 4,365,865 to Stiles. Typically, the thick protective layer (referred to herein as the "buffer layer" or the "second coating") has a thickness of around 325 microns. Various materials have been used for the buffer layer including nylons, polyesters, and polyvinyl chlorides.

A recurring problem with this type of construction involves removing (i.e. stripping) all of the protective layers (i.e. the buffer layer and the first protective coating) from the fiber to expose the cladding. Hand operated and motorized tools have been developed for this purpose. See, for example, U.S. Pat. No. 4,748,871 to Zdzislaw and U.S. Pat. No. 4,852,244 to Lukas.

Several different solutions have been attempted to address this problem. First protective coatings, including some form of cured silicone or particulate silicone, with reduced adhesion for the glass cladding have been suggested. However, problems remain because of tight adhesion between the buffer layer and the first protective layer.

Placing an ultra-thin layer of decoupling material between a first protective coating and a buffer layer has also been suggested. However, this decoupling material is generally a water insoluble material and must be blended with an organic solvent, such as acetone, for processing. This process generates additional problems of removing and disposing of a quantity of highly volatile and flammable material.

The incorporation of a release agent between a first protective coating and a buffer layer of an optical waveguide fiber has also been suggested. Release agents such as silicone oil, a petroleum lubricant, a layer of colloidal graphite or talc have been proposed. However, these fluid type release agents at an interfacial layer can leak from the outer shielding of the waveguide and contaminate electronic components.

U.S. Pat. No. 5,181,268 to Chien sought to address the problem by utilizing an interfacial layer surrounding the first protective coating where the interfacial layer contains a solid lubricant, such as polytetrafluoroethylene ("TEFLON™" A trademark of E.I. DuPont de Nemours Co., Wilmington, Del.), and a film forming binder. During production of the optical waveguide fiber, surfactants may be used to disperse the TEFLON™ and the binder. The use of the surfactant, however, results in foaming of the emulsion during mixing and coating. This foam interferes with the liquid coating materials of the interfacial layer properly adhering to the optical waveguide fibers, resulting in poor strippability of the fibers.

It is an object of the present invention to overcome these deficiencies.

SUMMARY OF THE INVENTION

The present invention relates to a tight buffered optical waveguide fiber which includes an optical waveguide fiber, a first protective coating which surrounds and is in contact with an external surface of the optical waveguide fiber, and an interfacial layer which surrounds and is in contact with an external surface of the first protective coating. The interfacial layer includes a surfactant and an antifoaming agent. The tight buffered optical waveguide fiber further includes a second protective coating, which surrounds and is in contact with an external surface of the interfacial layer.

Another aspect of the invention relates to a method of producing the tight buffered optical waveguide fiber. The method includes the steps of providing an optical waveguide fiber, applying a first protective coating to the external surface of the optical waveguide fiber, and coating the external surface of the first protective coating with a mixture which includes a liquid carrier, a film-forming binder, a solid lubricant comprising particles of a polymeric material, a surfactant, and an antifoaming agent. Following the coating step, the method includes removing the liquid carrier to form an interfacial layer on the external surface of the first protective coating which includes the film-forming binder, the solid lubricant, the surfactant, and the antifoaming agent, and applying a second protective coating to the external surface of the interfacial layer.

Tight buffered optical waveguide fibers having this structure and composition have been found to have excellent strippability properties. In particular, a foot or more of either the buffer layer or both the buffer layer and the first protective coating can be readily stripped from the fiber without damage to the fiber's optical or physical properties. Among other things, this high level of strippability results in a saving of installation cost and a saving of valuable space in splicing boxes where fibers are joined to one another. Further, the foregoing method is readily integrated into the overall process for producing optical waveguide fibers, which is an important advantage of the present invention.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

BRIEF DESCRIPTION OF THE DRAWINGS

FIG. 3 is a schematic diagram of a preferred process for applying an interfacial layer to an optical waveguide fiber.

FIG. 4 is a schematic diagram of a coater for use in the process of FIG. 3.

DETAILED DESCRIPTION OF THE INVENTION

Figures 1, 2:
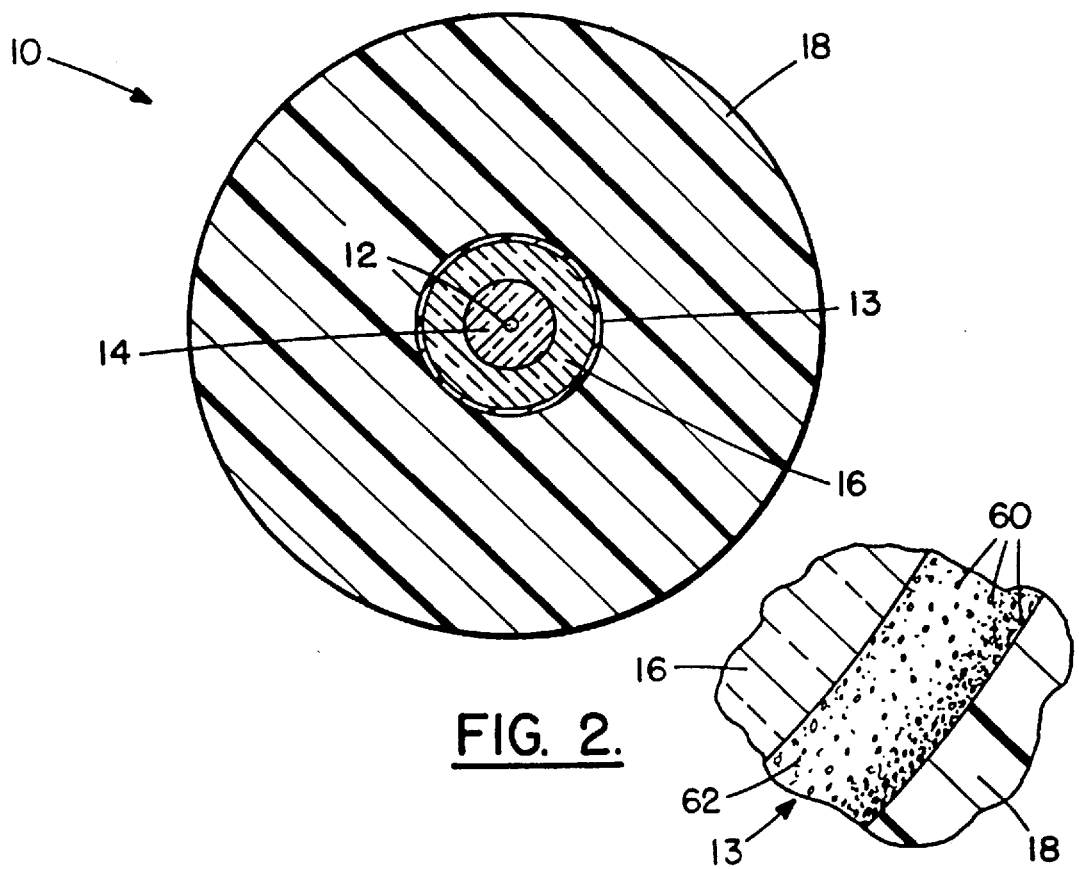
FIG. 1 is a cross-sectional view of a tight buffered optical waveguide fiber constructed in accordance with the invention.
FIG. 2 is an expanded, cross-sectional view of an interfacial layer constructed in accordance with the invention.

The present invention relates to a tight buffered optical waveguide fiber which includes an optical waveguide fiber, a first protective coating which surrounds and is in contact with an external surface of the optical waveguide fiber, and an interfacial layer which surrounds and is in contact with an external surface of the first protective coating. The interfacial layer includes a surfactant and an antifoaming agent. The tight buffered optical waveguide fiber further includes a second protective coating, which surrounds and is in contact with an external surface of the interfacial layer.

The invention can be used with a variety of optical waveguide fibers now known or subsequently developed, including, without limitation, single mode and multimode fibers, silica-based and non-silica-based fibers, and plastic fibers.

A cross-section of tight buffered optical waveguide fiber 10 prepared in accordance with the invention is shown in FIG. 1. The fiber includes core 12, cladding 14, first protective coating 16, and buffer layer 18. Between the first protective coating and the buffer layer is interfacial layer 13.

Core 12 and cladding 14 together make up the optical waveguide fiber. Typically, the cladding comprises substantially pure silica and the core comprises silica which has been doped to increase its index of refraction. As indicated above, the OD of a single mode core is generally around 10 microns, while that of the fiber cladding is around 125 microns. The OD of a multimode core is typically around 50–62.5 microns.

First protective coating 16 is composed of a polymeric material which most commonly is a UV curable acrylate polymer. Typically, the coating is composed of two layers of acrylate polymer, with the inner layer having a lower modulus than the outer layer. The OD of the first protective coating is generally around 250 microns.

Buffer layer 18 is also composed of a polymeric material. Among the materials which are commonly used for this layer are polyvinylchlorides, nylons, and polyesters. The OD of the buffer layer for a tight buffered construction is normally 900 microns.

Interfacial layer 13 provides a low friction interface between the first protective coating and the buffer layer. This layer will generally have a thickness of between about 4 and about 15 microns, with about 5 microns being especially preferred. The layer is composed of a solid lubricant, a film-forming binder, a surfactant, and an antifoaming agent where the solid lubricant comprises preferably more than about 60% by weight of the layer and most preferably at least about 90% by weight. In terms of function, the solid lubricant provides the desired strippability, while the binder holds the lubricant in place on the first protective coating. In the process of producing the fiber, the surfactant disperses the solid lubricant and the binder and the antifoaming agent prevents foaming during mixing and coating.

Various materials can be used for the solid lubricant, the preferred materials being particles of a low friction polymeric material (illustrated at 60 in FIG. 2). To facilitate processing, the particles are preferably dispersible in water. Examples of particles having these properties include those made of polytetrafluoroethylene (TEFLON™) or ultra high molecular weight polyethylene ("UHMWPE"). The particles preferably have an average or nominal size of less than a micron, e.g., on the order of 0.22 microns for TEFLON™ particles. Aqueous dispersions of TEFLON™ particles are available from the Specialty Polymers Division of E.I. DuPont DeNemours & Co. (Wilmington, Del.) and of UHMWPE particles from Chemical Corp. of America (East Rutherford, N. J.).

The film-forming binder (illustrated at 62 in FIG. 2) holds the solid lubricant in place both during processing, e.g., during application of the buffer layer, and during use of the finished fiber. As such, the film-forming binder should have a surface which is non-tacky and which has a hardness sufficient to withstand processing using conventional coating equipment. In practice, surfaces having a Knoop hardness number ("KHN") of at least about five as measured with a Tukon Micro-hardness Tester have been found to work successfully in the practice of the invention. See ASTM D 1474. When used with water dispersible particles, the film-forming binder should also be water dispersible.

The composition of the film-forming binder is chosen so that the binder will have an adequate level of adherence to the first protective coating to hold the solid lubricant in place on that coating. Also, at least a moderate level of adherence between the interfacial layer and the first protective coating aids in processing of the fiber, e.g., in overcoating the interfacial layer with the buffer layer. For a first protective coating composed of acrylate polymers, the desired adherence can be achieved by using, for example, a film-forming binder which is also composed of acrylate polymers to provide chemical compatibility between the binder and the first protective coating.

Surfactants are utilized to disperse the film-forming binder and the solid lubricant. Typically, the surfactant comprises 6–10% by weight of the interfacial layer and most preferably comprises about 8% by weight. A suitable surfactant is sold by 3M (Minneapolis, Minn.) under the product designation FC-143.

The antifoaming agent may be any antifoaming agent which reduces foaming of the solid lubricant-film forming binder-surfactant dispersion. Preferred antifoaming agents are silicone antifoaming agents. Especially preferred antifoaming agents are Dow Corning® 1410 Emulsion and Dow Corning® Additive 62. Typically, the antifoaming agent comprises from about 10 ppm to about 0.5 wt. % of the interfacial layer. More preferably, the antifoaming agent comprises about 50 ppm to about 0.1 wt. % of the interfacial layer, with about 50 ppm to about 1,000 ppm being most preferred.

Preferably, the interfacial layer is more adherent to first protective coating 16 than to buffer layer 18. In this way, the buffer layer can be readily stripped from the fiber leaving behind the interfacial layer and the first protective coating.

An interfacial layer comprising TEFLON™ particles, a binder composed of acrylic polymers, such as those sold by Rohm and Haas Company (Philadelphia, Pa.) under the RHOPLEX® trademark, a surfactant, and an antifoaming agent, has been found to bind more strongly to a first protective coating composed of an acrylate polymer than to a buffer layer composed of polyvinylchloride ("PVC"). In particular, when an interfacial layer of this type is applied to the first protective coating as a water dispersion, the particles tend to "bloom" to the external surface of the interfacial layer (see FIG. 2). This blooming produces an increased concentration of particles at the external surface which reduces the adherence between the interfacial layer and the buffer layer.

The optical waveguide fiber and the first protective coating can be formed by conventional process known in the art. Similarly, the buffer layer can be applied to the interfacial layer using conventional coating techniques. The interfacial layer itself is preferably formed using a liquid (water) dispersion of the solid lubricant, the film-forming binder, the surfactant, and the antifoaming agent. FIGS. 3 and 4 show suitable apparatus for forming this layer.

In overview, the coating process shown in these figures employs a countercurrent flow technique wherein fiber 20 passes through coater 22 from left to right, while the dispersion containing the solid lubricant, film-forming binder, the surfactant, and the antifoaming agent passes through the coater in the opposite direction, i.e., from right to left as shown by arrows 24 in the figures. This countercurrent technique improves the coating process in two ways. First, it washes coagulated particles away from die 26. Such clumps of particles, if large enough, can plug the die and result in fiber breakage. Second, the countercurrent flow also moves any air bubbles which form in the dispersion away from the die. Although such bubbles do not normally result in fiber breakage, if they become centered on the die, they can interrupt the flow of the dispersion, thus preventing the fiber from being coated.

The apparatus shown in FIGS. 3 and 4 operates as follows. Fiber 20, which comprises a core, a cladding, and a first protective coating, is fed from payout spool 28 through pulleys 30 and dancer 32 to coater 22. Pump 42 feeds dispersion from coating reservoir 44 to coater 22 by means of feed lines 48 and 50. The dispersion returns to the coating reservoir by means of line 52.

Lines 48, 50, and 52 can be TYGON® tubing and pump 42 can be a peristaltic pump producing a flow rate on the order of 270 milliliters per minute. Because particles of solid lubricant and, in particular, TEFLON™ particles undergo shear-induced coagulation, pumps which produce less shear than peristaltic pumps can be used if desired. For example, air driven double diaphragm pumps feeding into large diameter tubing, e.g., one and a half inch tubing, can be used to produce reduced shear levels.

As shown in FIG. 4, coater 22 includes die 26, die holder 46, and baffle 54 which guides the incoming dispersion so that it flows horizontally past fiber 20. For an input fiber whose diameter is less than or equal to 245 microns, a 11.0 mil die can be used, and for fibers having a diameter somewhat greater than 245 microns, the size of the die can be increased to 11.26 mil. In either case, the thickness of the dried interfacial layer will be about 5 microns. Dispersions containing TEFLON™ particles and RHOPLEX®) binder have been found to turn slightly bluish when in contact with brass fittings. Accordingly, such fittings should generally be avoided in constructing coater 22 and its associated feed system.

After leaving coater 22, the fiber passes through drying oven 34 which removes the water from the dispersion. A three stage oven having a first 0.5 meter segment operated at 170° C., a second 0.5 meter segment operated at 225° C., and a third 1.0 meter segment operated at 300° C. has been found to work successfully. Air is bled through the oven to remove evaporated water. The Du Pont aqueous dispersions of TEFLON™ particles referred to above include a small amount of ammonia for pH control. Similarly, the RHOPLEX® binders include ammonia as well as traces of ethyl acetate. To avoid discharge of these materials into the atmosphere, a fume hood can be placed at the exit of oven 34.

After leaving oven 34, the coated fiber is allowed to air cool and then passes through pulleys 36 and dancer 38 for collection on take-up spool 40. Buffer layer 18 can then be applied to the fiber using conventional extrusion techniques. Alternatively, the dried fiber can be directly fed into an extrusion coater without an intermediate collection step. In such a case, the fiber needs to be adequately cooled before the buffer layer is applied. Such cooling can be facilitated by passing a high volume air stream over the dried fiber prior to the application of the buffer layer.

Without intending to limit it in any manner, the present invention will be more fully described by the following examples.

EXAMPLES

Example 1

Tight buffered optical waveguide fibers were prepared having an interfacial layer between a first protective coating and a buffer layer. The first protective coating comprised two layers of UV curable acrylate resin available from DSM-Desotech, Inc. (Des Plains, Ill.) under the product designations 950-076 (inner layer) and 955-044 (outer layer). The OD of the first protective coating prior to the applications of the interfacial layer was approximately 250 microns.

The buffer layer comprised a single layer of PVC polymer available from Gary Chemical, Leonminster, Mass., under the product designation PVC GW 2052 Special. The OD of this layer was 900 microns.

The interfacial layer was made from a water dispersion of Du Pont TEFLON™ particles sold under the product designation 30B and a 1:1 mixture by volume of two Rohm and Haas RHOPLEX® binders sold as water dispersions under the product designations B-60A and B-85. Typical properties of these materials are set forth in Table 1.

TABLE 1

|  | TEFLON ™ 30B | RHOPLEX ® B-60A | RHOPLEX ® B-85 |
| --- | --- | --- | --- |
| Appearance | White Milky | White Milky | White Milky |
| Resin Solid % | 60 | 46.5 | 38 |
| Specific gravity of liquid | 1.5 | 1.07 | 1.07 |
| pH | 9.8 | 9.50 | 9.7 |

In addition to the TEFLON™ particles, the 30B product also contains approximately eight percent (by weight of PTFE) of a non-ionic wetting agent and stabilizer. See Du Pont Product Brochure entitled "Fluoropolymers Industrial—Grade 30B", (1988).

RHOPLEX® B-60A is a soft material, while RHOPLEX® B-85 is a hard material. See Rohm and Haas Product Brochure entitled "RHOPLEX® B-85 Acrylic Emulsion Polymer" (1983). The 1:1 mixture to these two materials provides a binder having sufficient hardness for subsequent processing and a film-forming temperature of approximately 31° C. Higher amounts of B-85 result in higher film-forming temperatures which reduces processing flexibility at room temperature.

To form the particle/water/binder dispersion, the RHOPLEX® B-60A and B-85 were mixed together with slow stirring and then mixed with the TEFLON™ 30B dispersion with surfactant. The volumes of RHOPLEX® mixture and TEFLON™ dispersion were varied to produce TEFLON™ dispersion weight percents in the final mixture of between 75 and 95 percent.

To determine the effectiveness of an antifoaming agent to suppress foaming in the emulsion of the present invention, an experiment was run in which 10 ml of an emulsion containing an aqueous dispersion of TEFLON™ particles with surfactant, RHOPLEX® binders, and an antifoaming agent, Dow Corning® Antifoam 1410 was shaken 20 times and the height of the foam was monitored immediately after shaking and after standing. The results are shown below in Table 2:

TABLE 2

| Foam height (mm) | Antifoaming agent PPM | | | | |
|---|---|---|---|---|---|
| | Control (0) | 10 | 50 | 100 | 500 |
| After shake 0 min | 15 | 15 | 7 | 6 | 1 |
| 5 min | 15 | 15 | 6 | 4 | 0 |
| 10 min | 15 | 15 | 5 | 3 | 0 |

The emulsion containing 50 ppm of the antifoaming agent suppressed the foam by half of the height. With 500 ppm of antifoaming agent, the emulsion produced virtually no foam after the shake period, and the foam dispersed quickly, with no foam remaining after the 5 minute period.

Example 2

In a second experiment, Dow Corning® Additive 62 replaced Dow Corning® Antifoam 1410 as an antifoaming agent in the aqueous dispersion of Teflon™ particles with surfactant and Rhoplex® binders of Example 1. The results of the shaking test are shown in Table 3:

TABLE 3

| Foam height (mm) | Additive 62 (PPM) | | | | |
|---|---|---|---|---|---|
| | Control (0) | 50 | 100 | 500 | 1000 |
| After shake 0 min | 17 | 11 | 9 | 7 | 6 |
| 5 min | 17 | 11 | 9 | 7 | 6 |
| 10 min | 17 | 11 | 9 | 6 | 5 |

With 100 ppm of the Dow Corning® Additive 62, the emulsion generated about half of the foam height as generated with the control.

Further, in a pilot coating process run, an optical fiber was coated with the aqueous dispersion of Teflon™ particles with surfactant and Rhoplex® binders with Dow Corning® Additive 62 to depress foam. The results are shown in Table 4:

TABLE 4

| Additive 62 (PPM) | Control | 100 | 300 | 500 |
|---|---|---|---|---|
| Foam height (mm) | 6 | <6 | 0 | 0 |

The Dow Corning® Additive 62 totally eliminated the foam at 300 ppm level in the pilot coating process.

A variety of modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed:

1. A tight buffered optical waveguide fiber comprising:
   (a) an optical waveguide fiber;
   (b) a first protective coating surrounding and in contact with an external surface of said optical waveguide fiber;
   (c) an interfacial layer surrounding and in contact with an external surface of said first protective coating, said interfacial layer comprising a surfactant and an antifoaming agent; and
   (d) a second protective coating surrounding and in contact with an external surface of said interfacial layer.

2. The tight buffered optical waveguide fiber of claim 1, wherein the antifoaming agent is a silicone antifoaming agent.

3. The tight buffered optical waveguide fiber of claim 2, wherein the antifoaming agent comprises from about 10 ppm to about 0.5 wt. % of said interfacial layer.

4. The tight buffered optical waveguide fiber of claim 3, wherein the antifoaming agent comprises from about 50 ppm to about 1,000 ppm of said interfacial layer.

5. The tight buffered optical waveguide fiber of claim 1, wherein said interfacial layer further comprises a solid lubricant and a film-forming binder.

6. The tight buffered optical waveguide fiber of claim 5, wherein said interfacial layer is applied to said first protective coating as a liquid dispersion of particles.

7. The tight buffered optical waveguide fiber of claim 6, wherein the liquid dispersion is an aqueous dispersion.

8. The tight buffered optical waveguide fiber of claim 5, wherein the solid lubricant comprises polytetrafluoroethylene.

9. The tight buffered optical waveguide fiber of claim 5, wherein the solid lubricant comprises ultra high molecular weight polyethylene.

10. The tight buffered optical waveguide fiber of claim 5, wherein the film-forming binder comprises an acrylic polymer.

11. The tight buffered optical waveguide fiber of claim 5, wherein the solid lubricant comprises more than about 60 percent by weight of the interfacial layer.

12. A method for forming a tight buffered optical waveguide fiber comprising the steps of:
   (a) providing an optical waveguide fiber;
   (b) applying a first protective coating to an external surface of said optical waveguide fiber;
   (c) coating an external surface of said first protective coating with a mixture comprising:
      (i) a liquid carrier;
      (ii) a film-forming binder;
      (iii) a solid lubricant comprising particles of a polymeric material;
      (iv) a surfactant; and
      (v) an antifoaming agent;
   (d) removing the liquid carrier to form an interfacial layer on an external surface of said first protective coating comprising the film-forming binder, the solid lubricant, the surfactant, and the antifoaming agent; and
   (e) applying a second protective coating to an external surface of said interfacial layer.

13. The method of claim 12, wherein the antifoaming agent is a silicone antifoaming agent.

14. The method of claim 13, wherein the antifoaming agent comprises from about 10 ppm to about 0.5 wt. % of the interfacial layer.

15. The method of claim 14, wherein the antifoaming agent comprises from about 50 ppm to about 1,000 ppm of the interfacial layer.

16. The method of claim 14, wherein the liquid carrier comprises water.

17. The method of claim 16, wherein the liquid carrier is removed by heat.

18. The method of claim 14, wherein the particles comprise polytetrafluoroethylene.

19. The method of claim 14, wherein the particles comprise ultra high molecular weight polyethylene.

20. The method of claim 14, wherein the film-forming binder comprises an acrylic polymer.

* * * * *